United States Patent Office 3,373,316
Patented Mar. 12, 1968

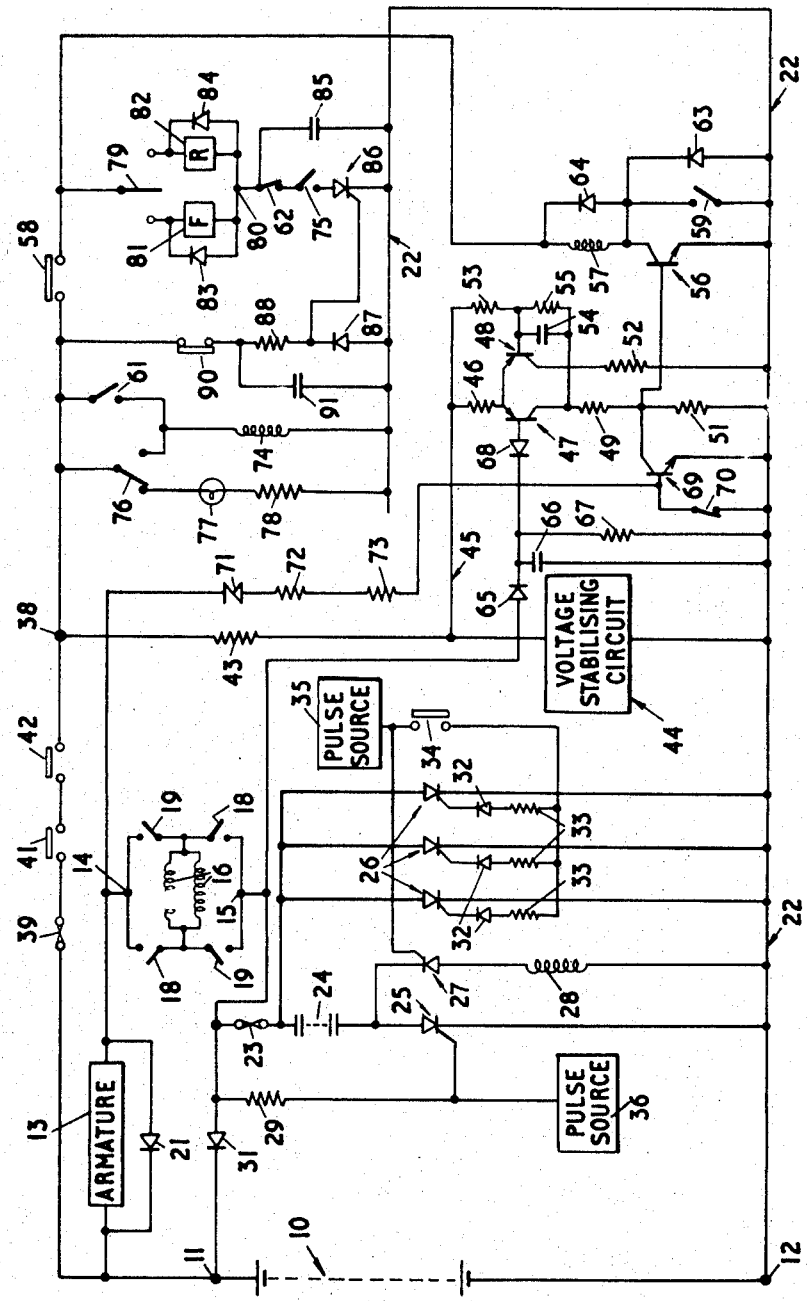

3,373,316
ELECTRICAL CONTROL SYSTEM FOR AN INDUSTRIAL TRUCK
Norman Harold George Palmer, Sutton Coldfield, England, assignor to Eaton Yale & Towne Inc., a corporation of Ohio
Filed Oct. 26, 1965, Ser. No. 505,250
Claims priority, application Great Britain, Nov. 17, 1964, 46,719/64
8 Claims. (Cl. 317—13)

This invention relates to an electrical control system for an industrial truck.

A control system according to the invention comprises an electric motor for driving the truck, the motor incorporating a field coil assembly, a first pair of contactors which when closed permit current flow through the field coil assembly in one direction, a second pair of contactors which when closed permit current flow through the field coil assembly in the opposite direction, a pair of terminals which in use are connected to the truck battery, one or more switching devices controlling current flow from said pair of terminals through the contactors to the field coil assembly means for switching said device or devices on and off to provide a pulsating current flow from said terminals, a safety circuit for opening the contactors whenever a switching device is on for longer than a predetermined period of time, a testing circuit operable before the truck is moved to test the safety circuit, and means preventing closing of the contactors unless the safety circuit is first tested and is operative.

The accompanying drawing is a circuit diagram illustrating one example of the invention. The mechanical details of the truck are not shown, since they form no part of the invention.

Referring to the drawing, the system includes supply terminals 11, 12 which in use are connected respectively to the positive and negative terminals of a 36 volt battery 10 on the truck. The truck is driven by a motor having an armature 13 and a field coil assembly including terminals 14, 15, and field coils 16 connected in parallel. The field coils have opposite ends thereof connected to the terminals 14, 15 respectively through a pair of forward contactors 18 which when closed permit current to flow through the field coils from the terminals 14, 15 in one direction, and in addition opposite ends of the field coils are connected to the terminals 15, 14 respectively through a pair of reverse contactors 19 which when closed permit current to flow through the field coils from the terminals 14, 15 in the opposite direction.

The terminal 14 is connected through the armature 13 to the terminal 11 the armature being bridged by a diode 21 having its cathode connected to the terminal 11. The terminal 15 is connected through a series circuit to a negative line 22 connected to the terminal 12, the series circuit incorporating a fuse 23, a capacitor 24 and the anode-cathode path of a controlled rectifier 25. A point intermediate the fuse 23 and capacitor 24 is connected to the anodes of three controlled rectifiers 26 having their cathodes connected to the line 22, whilst a point intermediate the capacitor 24 and controlled rectifier 25 is connected to the cathode of a controlled rectifier 27 having its anode connected through an inductor 28 to the line 22. The gate of the controlled rectifier 25 is connected to the terminal 11 through a resistor 29 in series with the anode-cathode path of a diode 31, the anode of the diode 31 being connected to the terminal 15.

The gates of the controlled rectifiers 26 are connected respectively through the cathodes and anodes of three diodes 32 to the ends of three resistors 33, the other ends of which are connected through a microswitch 34 to a pulse source 35. A second output from the pulse source 35 is applied to the gate of the controlled rectifier 27. A second pulse source 36 is connected to the gate of the controlled rectifier 25. The microswitch 34 is closed when the throttle pedal of the truck is depressed.

The operation of this part of the circuit is as follows:
Assuming that the truck has started, so that the microswitch 34 is closed and one pair of contactors 18 or 19 is closed, the control system operates in cycles under the control of the pulse sources 35, 36. At the commencement of each cycle, a first pulse is applied by the source 36 to the rectifier 25, which conducts so that the capacitor 24 charges positively by way of the armature 13, contactors 18 or 19 and field coils 16. The terminal 15 is now at a positive potential, and when the capacitor 24 is fully charged so that the anode-cathode current of the rectifier 25 falls to zero, the rectifier 25 is held conductive by gate current flowing through the resistor 29 thereby ensuring that the capacitor 24 remains fully charged.

After a variable delay, a second pulse is received from the source 35 and switches on rectifiers 26 and 27. The rectifiers 26 now conduct the main motor current to drive the truck, and the rectifier 27 provides a path for discharge of the capacitor 24 through the rectifiers 26 and the inductor 28 so that the capacitor 24 now becomes negatively charged. Moreover, when the rectifiers 26 fire, the voltage at terminal 15 falls almost to the negative battery voltage, so removing the gate current from the rectifier 25 which, in the absence of any anode-cathode current, switches off.

After a further fixed delay, the source 36 produces a third pulse to fire the rectifier 25 again, whereupon the capacitor 24 discharges and reverse biases the rectifiers 26 to turn them off. The cycle then begins again with the capacitor 24 charging positively. Thus, the third pulse is the first pulse of the next cycle. While the rectifiers 26 are off, motor current continues to flow by virtue of the diodes 28 and 31, which conduct back E.M.F. generated by the motor.

The widths of the pulses applied to the motor are determined by the interval between the second and third pulses, which is fixed. The speed of the motor is determined by the frequency of the cycles, which is governed by the delay between the first and second pulses, which in turn is governed by the position of the throttle pedal.

The detailed arrangement of the pulse sources is not disclosed since it can take a variety of forms which can readily be designed. Conveniently, the source 36 includes a capacitor which starts to discharge at a fixed rate when the rectifiers 26 fire, a pulse being produced after a fixed delay when the capacitor voltage reaches a predetermined value. The source 35 also includes a capacitor which starts to charge through a transistor when the rectifiers 26 are switched off, and produces a pulse when the capacitor voltage reaches a predetermined value. The charging current has a value which is determined by the position of the throttle pedal, and the instants at which the capacitors start to charge are readily determined by sensing the voltage charges at the terminal 15 when the rectifiers 26 are turned on and off. Full details of the speed control arrangement can be found in pending application No. 46,721/64.

The terminal 11 is connected to a terminal 38 through a series circuit incorporating a second fuse 39, a switch 41 which is closed when the driver of the truck is seated on the truck and a switch 12 which is operated by a key. The terminal 38 is connected to the line 22 through a resistor 43 in series with a voltage stabilising circuit 44 which in a typical example maintains a voltage of 27 volts between the line 22 and a positive line 45. The line 45 is connected through a resistor 46 to the emitters of a pair of p-n-p transistors 47, 48. The collector of the transistor 47 is connected to the line 22 through resistors 49, 51 in series, whilst the collector of the transistor 48 is connected to the line 22 through a resistor 52. The base of the transistor 48 is connected to the line 45 through a resistor 53, and to the collector of the transistor 47 through a capacitor 54 and a resistor 55 in parallel.

A point intermediate the resistors 49, 51 connected to the base of an n-p-n transistor 56 having its emitter connected to the line 22 and its collector connected to the terminal 38 through a relay coil 57 and a microswitch 58 in series. The relay coil 57 operates first and second normally open contacts 59, 61 and a third normally closed contact 62 the contact 59 being connected in parallel with the cathode-anode path of a diode 63 across the collector and emitter of the transistor 56. A diode 64 is connected across the relay coil 57.

The terminal 15 is connected to the anode of a diode 65, the cathode of which is connected to the line 22 through a capacitor 66 and a resistor 67 in parallel, and is also connected to the base of the transistor 47 through the cathode and anode of a diode 68. Moreover, the terminal 14 is connected to the base of an n-p-n transistor 69 through a series circuit including a Zener diode 71, a resistor 72, and a resistor 73. The transistor 69 has its emitter connected to the line 22 and its collector connected to the junction of the resistors 49, 51.

There is further provided a second relay the coil 74 of which has one end connected to the line 22 and its other end connected through the contact 61 to the terminal 38. The relay coil 74 controls a normally open contact 75, a normally closed contact 70 connected between the base of the transistor 69 and the line 22, and a contact 76 which normally completes a circuit from the terminal 38 to the line 22 through a warning lamp 77 and a resistor 78 in series, but which when the relay coil 78 is energised completes a hold-on circuit thereto in parallel with the contact 61.

The terminal 38 is connected through the microswitch 58 to a selector arm 79 which is movable to complete circuits to a terminal 80 either by way of a pair of coils 81 which operate the forward contractors 18 or by way of a pair of coils 82 which operate the reverse contactors 19. Diodes 83, 84 are connected in parallel with the coils 81, 82 respectively to absorb back E.M.F. The terminal 80 is connected to the line 22 through parallel paths one of which contains a capacitor 85 and the other of which contains the contacts 62, 75 and the anode-cathode path a controlled rectifier 86 in series. The gate of the rectifier 86 is connected to the line 22 through the cathode and anode of a diode 87, and to the terminal 38 through a resistor 88 and a third microswitch 90 in series, the resistor 88 and diode 87 being bridged by a capacitor 91.

The circuit described provides a fail-safe arrangement, and also ensures that the operativeness of the fail-safe arrangement must be tested before the truck can be started. The fail-safe arrangement will be described first, and for this purpose it will be assumed that the truck is operating normally with coil 74 energised and coil 57 de-energised, so that either the forward or reverse contactor coils 81, 82 are energised by way of the relay contacts 62, 75, and the controlled rectifier 86 in series, and pulses being applied as previously described to operate the motor.

After the first pulse in each cycle, the terminal 15 is at substantially the positive battery potential, and so the capacitor 66 charges to this potential. When the second pulse in each cycle fires the controlled rectifiers 26, the potential at the terminal 15 falls, and the capacitor 66 discharges through the resistor 67. In normal operation, the first pulse of the next cycle arrives before the voltage across the resistor 67 falls sufficiently to switch on the transistor 47, and the capacitor 66 then recharges to the battery voltage. However, if the first pulse fails to arrive, the capacitor 66 continues to discharge with the result that the bistable Schmitt trigger circuit constituted by the transistors 47, 48 switches from its normal state with the transistor 48 conducting to its state with the transistor 47 conducting. The voltage across the resistor 51 now rises sufficiently to switch on the transistor 56. The relay coil 57 is now energised and holds on through the contact 59 and breaks the circuit to the contactor coils 81, 82 by opening the contact 62. Moreover, the contact 61 closes but has no effect. The truck cannot be started again until the coil 57 is de-energised by opening of the microswitch 58 when the throttle pedal is released.

When starting the truck, an operator closes the switches 41, 42 and can then move the selector arm 79 to select forward or reverse direction. On depressing the throttle pedal, the microswitches 34, 58 close and the microswitch 90 opens but although the controlled rectifiers 86 is supplied with gate current, the contactor coils are not energised because the contact 75 is open. However, the warning lamp 77 is illuminated by way of the contact 76, and since at this stage the voltage across the capacitor 66 is low, the transistor 47 conducts and the relay 57 is energised and holds on, provided that the fail-safe circuit is operating satisfactorily. The contact 61 now serves to energise the relay coil 74, which holds on through the contact 76, the warning lamp now being extinguished. The contact 75 is now closed, but the contact 62 is open and so the contactor coils 81, 82 remain de-energised.

In order to start the truck, the throttle pedal must be released. This action opens the microswitch 58 and so de-energises the relay coil 57. However, the relay coil 74 remains energised, and so when the throttle is depressed again the contactor coils will be energised because the contact 62 is closed. The capacitor 66 now charges up, so that the relay 57 will only be operated in the event of a fault.

It is found that when the relay coil is energised and the contactors closed on depressing the throttle pedal, the contactors may not close properly at first, and the fail-safe circuit may operate before the contactors close fully. In order to prevent this, the circuit employing the Zener diode 71 is incorporated. When the contactors are fully closed and the rectifiers 26 are conducting, the voltage drop across the Zener diode is below its breakdown value and so the Zener diode has no effect. However, when the contactors are not fully closed, the voltage drop across the Zener diode causes it to conduct and switch on the transistor 69. The base of the transistor 56 is prevented from rising high enough to switch on so that energisation of the relay coil 57 through the transistor 56 is prevented. It will be appreciated that the Zener diode 71 breaks down during testing, but this does not cause the third transistor to conduct because of the presence of the contact 70, which opens only after the fail-safe circuit has been tested.

The purpose of the rectifier 86 and its associated components is to prevent possible damage which might be caused if the throttle pedal is depressed before the direction of travel is selected by means of the arm 79. Unlike the microswitches 58, 34 which close when the throttle pedal is depressed, the microswitch 90 opens upon depression of the throttle pedal. Provided that the arm 79 is actuated before the throttle pedal, the rectifier 86 receives gate current by way of the microswitch 90 and resistor 88, and so conducts as soon as microswitch 58 is closed. However, if the throttle pedal is actuated first, the microswitch 90 opens and the capacitor 91 discharges through the gate and cathode of the rectifier 86. If the arm 79 is actuated almost immediately, the contactor coils will be energised, but as soon as the capacitor 91 has discharged no further gate current is available and so actuation of the arm 79 will not result in energisation of the contactor coils.

Having thus described my invention what I claim as new and desire to secure by Letters Patent is:

1. An electrical control system for an industrial truck, comprising an electric motor for driving the truck, the motor incorporating a field coil assembly, a first pair of contactors which when closed permit current flow through the field coil assembly in one direction, a second pair of contactors which when closed permit current flow through the field coil assembly in the opposite direction, a pair of terminals which in use are connected to the truck battery, at least one switching device controlling current flow from said pair of terminals through the contactors to the field coil assembly, means for switching said device on and off to provide a pulsating current flow from said terminals, a safety circuit for opening the contactors whenever a switching device is on for longer than a predetermined period of time, a testing circuit operable before the truck is moved to test the safety circuit, and means preventing closing of the contactors unless the safety circuit is first tested and is operative.

2. A system as claimed in claim 1 including forward and reverse contactor coils energisable alternatively to close the first and second pairs of contactors respectively, said safety circuit including a first relay having a coil which is energisable when a switching device is on for longer than said predetermined period of time and when energised opens a contact in series with said contactor coils.

3. A system as claimed in claim 2 including a microswitch in series with the coil of the first relay, the microswitch being operated by the throttle pedal of the truck so that when the first relay coil is energised the contactors cannot be closed without releasing the throttle pedal to open the microswitch.

4. A system as claimed in claim 3 in which the testing circuit includes a second relay the coil of which is energised through a normally open contact of the first relay, the second relay operating a hold-on contact and a normally open contact in series with the contactor coils.

5. A system as claimed in claim 4 in which the hold-on contact completes a circuit to a warning lamp when the second relay is de-energised.

6. A system as claimed in claim 2 including a selector arm for determining whether the forward or reverse contactor coils are energised, and means for preventing energisation of the contactor coils if the selector arm is actuated after the throttle pedal is depressed.

7. A system as claimed in claim 2 including a bistable circuit which normally occupies a first state but when in its second state causes the first relay to be energised, a capacitor which is charged when said device is off, and discharges when the device is on, and means whereby the bistable circuit is driven to its second state when the voltage across the capacitor falls below a predetermined value, the arrangement being such that in normal operation of the system the device is switched off to re-charge the capacitor before the voltage across the capacitor falls below said predetermined value.

8. A system as claimed in claim 1, including an inhibiting circuit for preventing operation of the safety circuit until either the first pair or the second pair of contactors is closed, and means whereby the inhibiting circuit is ineffective during testing of the safety circuit.

References Cited
UNITED STATES PATENTS

| | | | |
|---|---|---|---|
| 2,506,809 | 5/1950 | Nims | 180—65 X |
| 2,976,945 | 3/1961 | Schreck | 180—65 X |
| 3,179,198 | 4/1965 | Hastings | 180—65 |

MILTON O. HIRSHFIELD, *Primary Examiner.*

J. D. TRAMMELL, *Assistant Examiner.*